Feb. 20, 1951          E. E. WHITE          2,542,952
TREE SAWING AND LOG HANDLING MACHINE
Filed Oct. 15, 1947          4 Sheets-Sheet 1
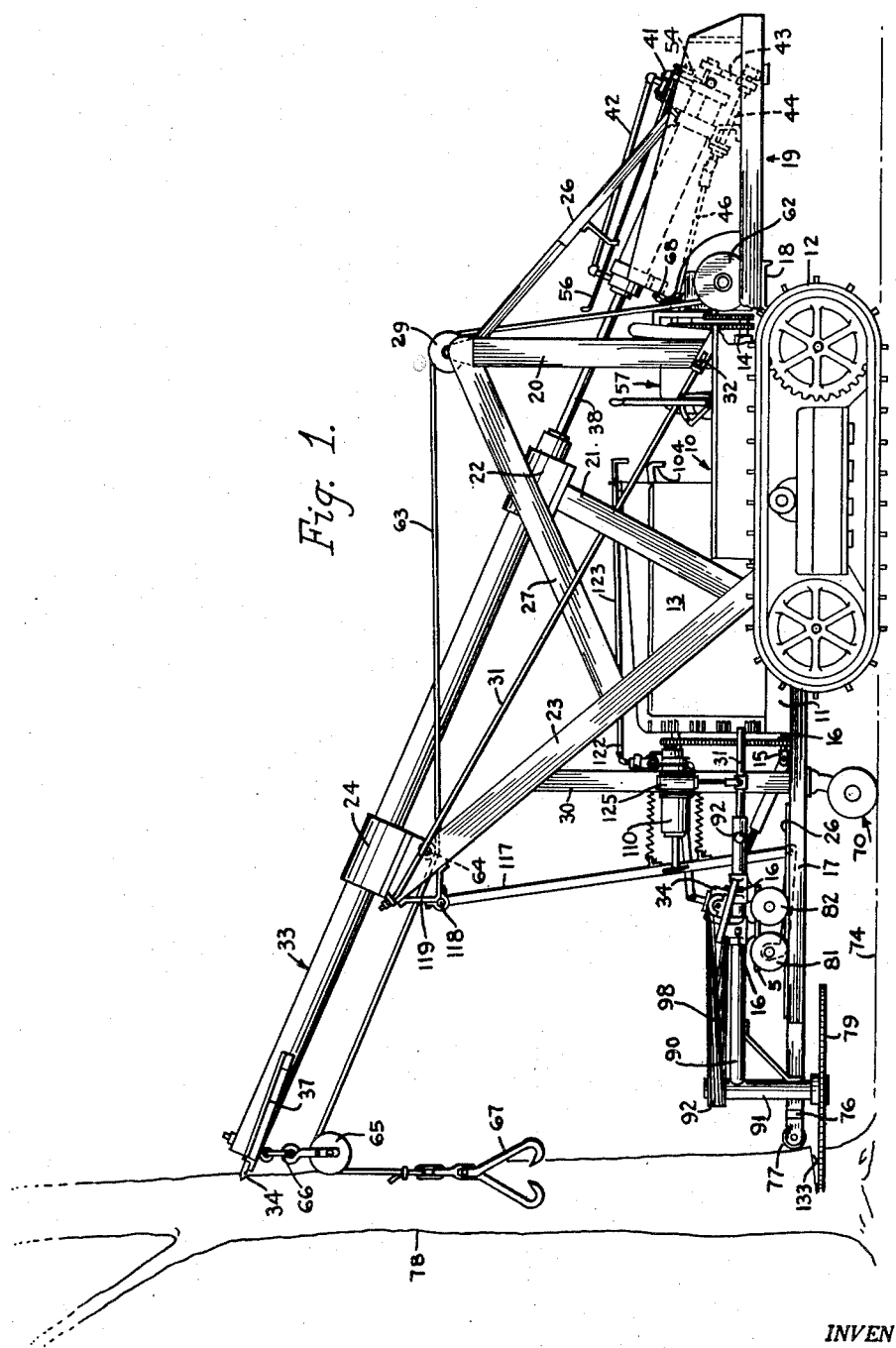
INVENTOR.
EDDIE E. WHITE
BY
ATTORNEYS

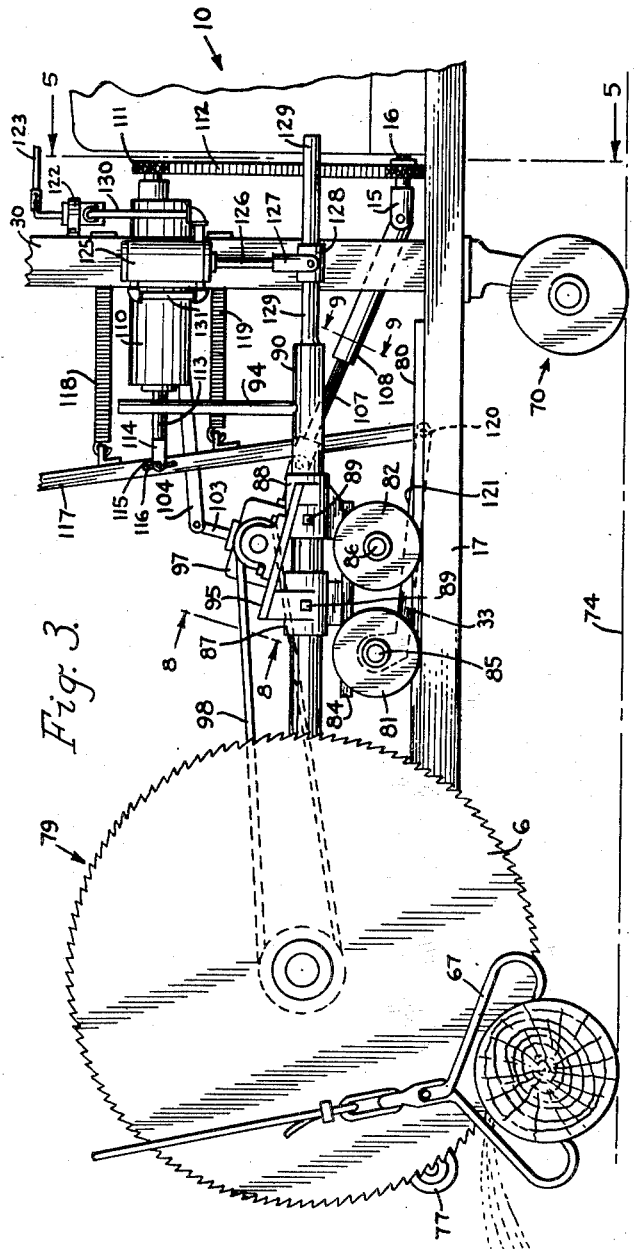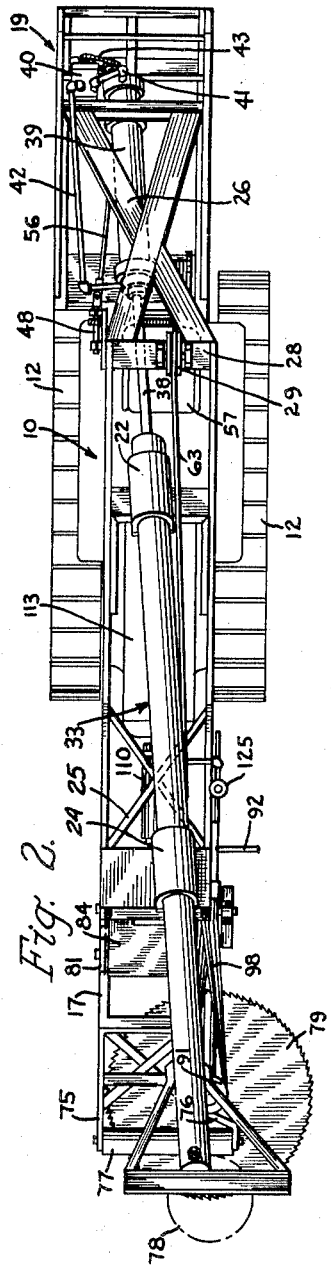

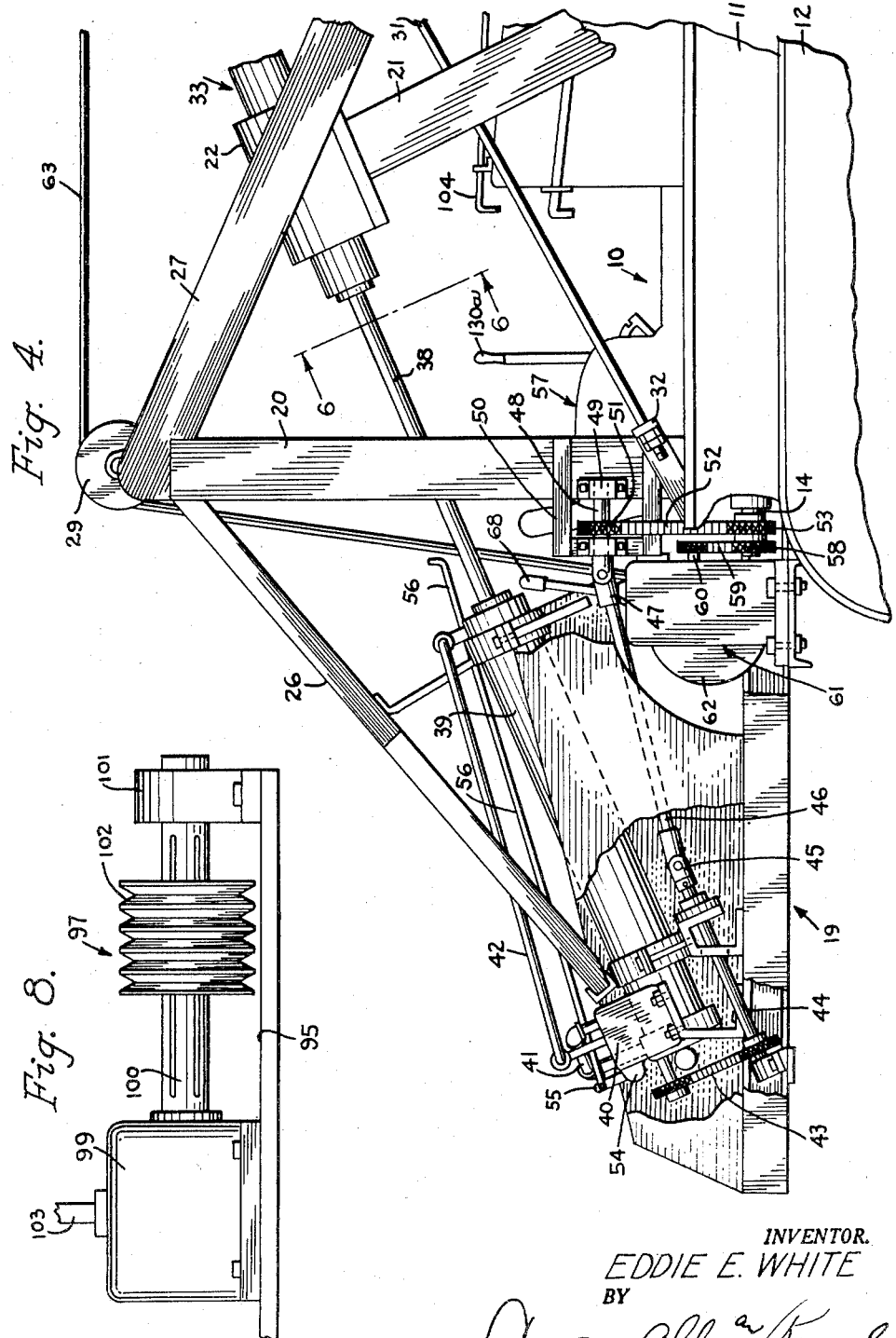

Feb. 20, 1951 E. E. WHITE 2,542,952
TREE SAWING AND LOG HANDLING MACHINE
Filed Oct. 15, 1947 4 Sheets-Sheet 4
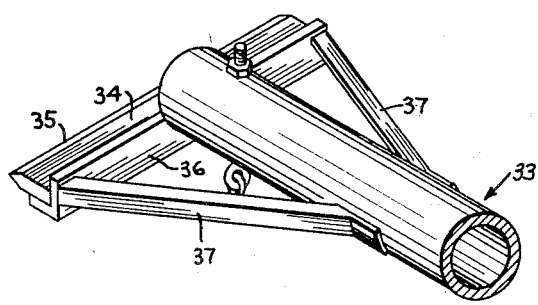
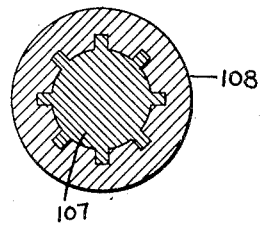
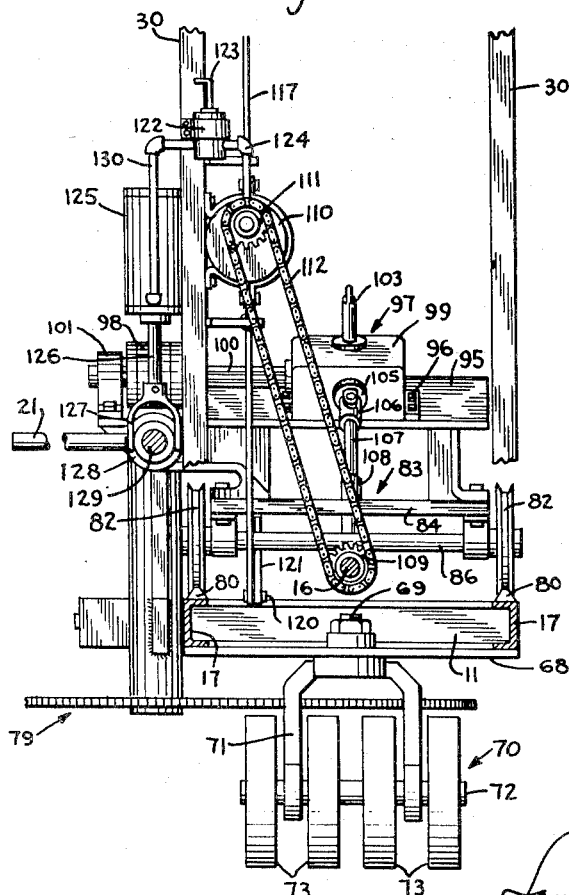
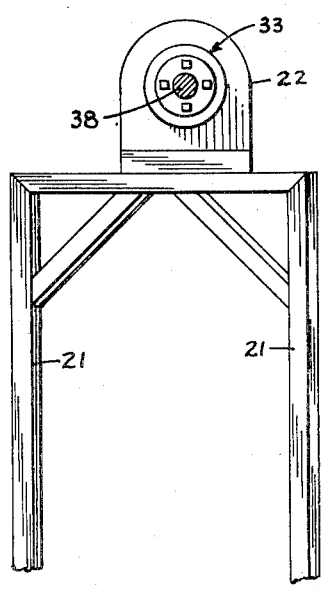
INVENTOR.
EDDIE E. WHITE
BY
ATTORNEYS Patented Feb. 20, 1951

2,542,952

UNITED STATES PATENT OFFICE 2,542,952

TREE SAWING AND LOG HANDLING MACHINE

Eddie E. White, Rocky Mount, N. C., assignor of one-half to Benjamin F. Lewis, Farmville, N. C.

Application October 15, 1947, Serial No. 779,917

3 Claims. (Cl. 143—43)

This invention relates to improvements in tractor borne logging apparatus whose operative components are power driven from the tractor engine, the primary object of the invention being to provide a single combined apparatus of this character which is capable, merely through adjustment and manipulation of its components, of performing a plurality of logging operations, including tree sawing and felling sawing of felled trees into logs, and loading of logs into piles or onto trucks.

Another important object of the invention is to provide apparatus of the character indicated which will prevent binding of the saw during the cutting operation, and will assure felling of the cut tree in the desired direction and position, and pulling up the felled tree along the desired path, through manipulation of a power operated extensible boom.

Another important object of the invention is to provide apparatus of the character indicated above having a saw assembly deriving its power from the forward end of the crankshaft of the tractor engine and mounted on tracks and conveyed to be moved forwardly hydraulically relative to the stationary tractor so as to properly feed the saw during a cutting operation, the saw assembly being arranged to cut at a uniform low level above the ground, and having bumper means engageable with a standing tree to prevent wedging and binding of the saw in the cut, from "kicking back" of the tree.

Another important object of the invention is to provide apparatus of the character indicated above in which the power for hydraulic pump means operating selectively operable hydraulic means for driving and controlling various components of the apparatus is derived from the power take-off of the tractor located at the saw thereof.

Another important object of the invention is the provision in apparatus of the character indicated above, of hydraulically operated means in the saw assembly for changing the cutting plane of the saw between horizontal and vertical positions, so that standing trees and felled logs can be sawed when desired, without other adjustment of the saw assembly.

Another important object of the invention is the provision in apparatus of the character indicated above of hydraulically operated means in the saw assembly whereby the axis of the saw can be changed at will, and wherein the belt drive means for the saw includes means which automatically line up the belt means in the different positions of the saw, so that loss in operating efficiency of the saw is unimpaired in its various operating positions.

Other important objects and advantageous features of the invention will be apparent from the following description and the drawings appended thereto, wherein for purposes of illustration only, a presently preferred embodiment of the invention is set forth in detail.

In the drawings:

Figure 1 is a general side elevation, showing apparatus in accordance with the present invention applied to cutting and felling a tree.

Figure 2 is a top plan view of the apparatus.

Figure 3 is a fragmentary elevation on an enlarged scale of the left hand side of the forward part of said apparatus, showing the saw assembly.

Figure 4 is a similarly enlarged fragmentary elevation of the right rear side part of said apparatus, showing the boom operating assembly, partly broken away to show details of construction.

Figure 5 is a fragmentary transverse vertical section, taken on the line 5—5 of Figure 3.

Figure 6 is a fragmentary transverse vertical section, taken on the line 6—6 of Figure 4.

Figure 7 is a fragmentary perspective view of the upper end of the boom with the tree-engaging blade attached.

Figure 8 (sheet 3) is a fragmentary front elevation, taken along the line 8—8 of Figure 3, showing the saw driving mechanism.

Figure 9 is a transverse vertical section taken on the line 9—9 of Figure 3, showing details of the telescoping drive shaft operatively connecting the front end of the tractor engine and the saw driving mechanism.

Referring in detail to the drawings, the herein illustrated logging apparatus comprises a suitable tractor 10, such as an Oliver "Cletrac" involving a frame 11 mounted upon endless tracks 12 and an engine 13 having a rear power take-off 14, and a drive connection 15 from the front end of the engine crankshaft 16. Secured to the sides of the tractor frame 11 and extending horizontally forwardly therefrom are saw assembly supporting side members or frame side extensions 17, 17. Extending rearwardly from and secured to the rear cross member 18 of the tractor frame is a horizontal framework 19 which is offset toward the right hand side of the tractor, as shown in Figure 2, which framework acts as the principal support for the boom operating mechanism.

Also mounted on and secured to the tractor frame 11 and rising principally above the tractor is the boom framework, which includes the two perpendicular rear members 20, 20 rising from the rear end of the tractor frames. The two rearwardly inclined members 21, 21 rise from the forward end of the tractor frame and support the forwardly inclined rear boom bearing 22; the two forwardly inclined members 23, 23 also rise from the front end of the tractor frame and support the forwardly inclined front boom bearing 24. Cross braces 25, 25 (Fig. 2) connect the two front boom frame members 23, 23, and cross braces 26, 26 connect the upper ends of the two perpendicular members 20, 20 to the rear part of the rear framework 19. Forwardly declining members 27, 27 have their forward ends connected to the front frame members 23, 23 intermediate their upper and lower ends, and the rear ends of the members 27, 27 are connected with the upper ends of the cross braces 26, 26 and the upper ends of the perpendicular members 20, 20, between whose upper ends is supported the plate 28 upon which is mounted the cable idler pulley 29. A left perpendicular member 30 extends between a rear portion of the left forward frame extension 17 and a point intermediate the upper and lower ends of the left forward frame member 23, the left perpendicular member 30 acting as a brace but also as a support for certain components of the saw driving mechanism as hereinafter described. Guy rods 31 are connected between the upper ends of the members 23, 23 and anchors 32 located at the lower ends of the rear perpendicular members 20, 20.

The boom 33 is a capped tube slidable forwardly and rearwardly in the bearings 22 and 24 and provided at its forward elevated end, as shown in Figure 7, with a flat transversely elongated tree engaging blade 34 having a double bevelled forward edge 35, with its back part seated in and secured to an angle iron 36 secured to the forward end of the boom and braced by arms 37, 37 extending from the ends of the angle iron to the sides of the boom.

Axially secured in the lower end of the boom 33 is the boom operating piston rod 38 which works in the hydraulic cylinder 39 which is rigidly supported upon the rear framework 19. As shown in Figure 2, the hydraulic cylinder 39 is canted toward the right at the rear and the boom 33 is canted toward the left at the front, so that the forward, elevated end of the boom is at the left hand side of the apparatus. Further, the cable idler pulley 29 is offset at the left hand side of the boom.

For operating the piston rod 38, which has a piston (not shown) working in the hydraulic cylinder 39, a rotary pump 40 is provided on the framework 19, as shown in Figure 4, which has pipes 41 and 42 connected to opposite ends of the cylinder, the pump being driven by a chain 43 connecting the pump shaft with a jack shaft 44 which has a universal coupling 45 connecting it with another jackshaft 46, whose forward end is connected by another universal coupling 47, with a sprocket shaft 48 mounted at one end at 49 on the right hand perpendicular member 20 and at the other end on a rearwardly extending bracket 50 on said member. The sprocket shaft 48 has its sprocket 51 driven by a sprocket chain 52 trained over the forward sprocket 53 of the rear power take-off 14 of the tractor engine.

A two-way manual valve 54 on the hydraulic pump 40 has an operating lever 55 to which is connected an operating rod 56 which extends forwardly to a convenient position immediately behind the driver's seat 57 of the tractor, so that the rod can be readily pushed by the driver and moved in one direction to project the boom 33 forwardly and in the opposite direction to retract the boom.

The second or rear sprocket wheel 58 on the rear engine power take-off 14 is connected by a chain 59 to the driving shaft 60 which is connected by clutch means (not shown in detail) to a cable winch 61 having the cable drum 62 upon which the cable 63 is wound, which is trained over the idler pulley 29 and extends forwardly under the boom 33 beneath a roller 64 and over a sheave 65 pendently connected as indicated at 66 to the forward end of the boom and terminating in a grappling hook 67. A clutch lever 68 on the winch 61, located behind and at the right of the driver's seat 57 provides for easy operation of the switch by the driver.

Located beneath the forward perpendicular members 30 and secured to the underside of the forward frame extensions 17, as shown in Figure 5, is a cross plate 68 whose middle point is vertically traversed by the stub axle 69 of a multiple wheel caster 70 which includes the fork 71, the axle 72 and, in this instance, the four wheels 73 which can engage the ground 74 to preclude forward tipping of the apparatus during its operation.

The sawing mechanism is mounted upon the forward frame extensions 17 principally forwardly of the forward perpendicular members 30. Braced prolongations 75 and 76 of the extensions 17 are on the forward ends of said extensions, the prolongation 76 being offset to the left, as shown in Figure 2, and a horizontal bumper roller 77 being journalled between the prolongations, to engage a tree 78 in advance of engagement of the circular saw 79 with such tree, and to remain in engagement with the tree throughout the major portion of the cutting operation, in such a way that the saw is protected as the apparatus is brought up to the tree and enables the apparatus to be maintained in proper position relative to the tree without imposition of strain upon the saw.

Behind the prolongations 75, 76 the extensions 17, 17 have tracks 80, 80 on their upper sides upon which roll the front and back side wheels 81, 82 of the saw carriage 83 which includes a horizontal plate-like part 84 under which the front and back axles 85, 86, respectively, are suitably attached for supporting the wheels 81, 81 and 82, 82, respectively.

From the middle of the carriage plate 84 rises a front horizontal tubular bearing 87 and a back horizontal tubular bearing 88 rises from the rear end of the plate 84. Each of these bearings is provided with a set-screw or set-bolt 89 for clamping engagement with the horizontal saw carrier rod 90 which is longitudinally slidable forwardly and rearwardly and can be axially rotated in the bearings, whenever the set screws are loosened by means of the handle 94.

The forward end of the saw carrier rod 90 has a cross head 91 which is offset toward one side of the axis of the rod and in which the saw shaft (not shown) is journalled which at the short end of the crosshead terminates in a belt pulley 92 and at the longer end in the circular saw 79. For tree cutting and felling the carrier rod 90 is turned on its axis to place the saw 79 in the depending horizontal position shown in Figure 1, in which the saw is unusually close to the ground 74 so that more of the length of the tree 78 is cut than is usually the case. For cutting a felled log 93 lying upon the ground 74, the saw carrier rod 87 is turned on its axis to place the saw 79 in a perpendicular plane, as shown in Figure 3. As shown in Figure 2, the saw 79 is offset to the left of the forward part of the apparatus, the saw carrier rod 90 being canted toward the left in substantially the same vertical plane as the boom 33. This arrangement brings the blade 34 on the upper end of the boom 33 and the median cutting edge of the saw 79 in substantial vertical alignment when cutting and felling a tree 78, as also shown in Figure 2. The lateral handle lever 94 is provided on the rear part of the saw carrier rod 90 for manually turning it upon its axis to change the saw 79 from horizontal to vertical position, and for moving the carrier rod 90 endwise to give the saw the desired initial adjusted position.

The top of the saw carrier rod bearings 87 and 88 have rearwardly canted surfaces upon which is supported a plate 95 upon which is bolted at 96 (Fig. 5) the belt drive unit 97. The belt drive unit can be shifted up and down the inclined plane provided by the plate 95 and the top of the bearings 87 and 88 to adjust the tension of the drive belt 98 which is trained over the saw shaft pulley 91. As shown in Figures 5 and 8, the belt drive unit 97 comprises the inclined plate 95, the reducing gear box 99 from the side of which projects the spline shaft 100 having its free end supported by a bearing 101 on the plate 95, and the multiple groove belt pulley 102, over which the saw driving belt 98, consisting of a number of V-belts, is trained. The saw shaft pulley 92 likewise is provided with a plurality of V-grooves to accommodate the individual V-belts constituting the saw drive belt 98. As is evident, the belt pulley 102 can slide back and forth on the shaft 100 to accommodate the different positions of the saw carrier shaft 90 and hence of the saw 79. The gear box 99 includes clutch mechanism (not shown) provided with a clutch lever 103 projecting from the top of the box and connected to an operating rod 104 which extends rearwardly along the tractor engine 13 to a position in front of the driver's seat 57.

From the rear of the gear box 99 there projects, as shown in Figures 3 and 5, a driven shaft 105 which is connected by a universal joint 106 with the upper end of a splined jackshaft 107 whose lower end is slidably telescoped in a hollow shaft 108, whose lower end is connected by the universal joint 15 with the front end of the tractor engine crankshaft 16. This sliding connection permits forward and rearward movement of the carriage 83 without impairment of the saw drive. The front end of the engine crankshaft 16 also includes a sprocket wheel 109 for driving the saw feeding means.

The saw-feeding component of the saw mechanism comprises the combined hydraulic cylinder and rotary pump 110 having the shaft including the sprocket wheel 111 which is driven by the chain 112 which is trained over the engine crankshaft sprocket wheel 109. The hydraulic cylinder 110 has a piston rod 113 terminating at its forward end in a clevis 114 having a pin 115 traversing a slot 116 provided in an intermediate part of an upright lever 117. Above and below the slot 116 contractile springs 118 and 119, respectively, are stretched between the lever 117 and the left hand perpendicular member 30, for retracting the lever 117 after it has been pushed forwardly by the piston rod 113 and the valve 122 has been returned to neutral position. The upper end of the lever 117 is stationarily pivoted at 118 on a bracket 119 on the upper end of the left hand forwardly inclined boom support member 23, and the lower end of the lever 117 is pivoted at 120 to the rear end of a horizontal lever 121, whose forward end is upset and connected to the forward axle 85 of the wheeled carriage 84. Hydraulic connection between the pump component and the cylinder component of the hydraulic element 110 for moving the piston rod 113 forwardly and thereby forwardly moving the lever 117 and through it causing the carriage 81 to roll forward on the tracks 80, and thereby feeding the saw 79 at a controlled rate, comprises a three-way valve 122, which is conveniently mounted on the left hand perpendicular member 30 above the hydraulic element 110 and has an operating rod 123 leading along the tractor engine 13 to a point within reach of the driver's seat 57. Appropriate fluid conduit means 124 lead between the hydraulic element 110 and the valve 122.

The valve 122 also controls the operation of a vertical hydraulic cylinder 125 which is mounted on the outer side of the left hand perpendicular member 30 and has a piston rod 126 having a clevis 127 on its lower end embracing and pivoted to a sleeve 128 which is slidably telescoped on a reduced portion 129 on the rear end of the saw carrier rod 90. Fluid connection of the pump of the hydraulic element 110 with the cylinder 125 is through the valve 122 and a conduit 130 (Fig. 3) connecting the valve with the lower end of the cylinder 125. Another conduit 131 (Fig. 3) connects upper and lower end portions of the cylinder 125. The piston rod 126 is normally extended downwardly so that both sets of wheels of the carriage 84 rest upon the rails 80 and the carriage and hence the saw 79 is in a level position. The valve 122 when operated to one position operates the hydraulic element 110. In its second or neutral position the valve acts as a by-pass, permitting the pump component of the element 110 to continue operation. In its third position the valve brings the cylinder 125 into operation, whereby the piston rod 126 is drawn upwardly so as to tilt the carriage 84 and hence the saw 79 forwardly on the axis of the front carriage axle 81. This tilting is utilized with the saw 79 in vertical position when cutting felled logs into sections, so as to assure that the saw reaches downwardly far enough to cut through the logs. At the end of such operation the valve 122 is returned to its neutral position and the carriage including the saw returns gravitationally to normal horizontal position.

The winch 61 is provided with braking means (not shown) which are applied and released by means of the hand lever 130a (Fig. 4) located at the left hand side of the driver's seat 57, whereby control of the cable 63 is provided when the clutch of the drum 62 is released. By releasing the lever 130 the grappling means 67 can be let down to engage a felled log for either lifting and loading the log upon a truck or log pile, or holding the log up against the saw 79 when set in vertical position for sawing a log in sections. For either of the latter two operations the brake lever is released and the drum clutch means is engaged so that the drum 62 is operated to wind up the cable 63 the required amount.

In operation, for cutting and felling a tree 78, the driver occupying the seat 57 moves the apparatus forwardly toward the tree in line with the direction it is desired to have the tree fall, until the bumper roller 77 is against the tree. With the tractor engine 13 running, the control rod 104 of the saw driving mechanism is then pushed forwardly by the driver so as to engage the clutch mechanism in the gear box 99 of the driving unit 97 and thereby start the saw 79 rotating. The boom control rod 56 is then pulled forwardly so as to open the pump valve 54 of the hydraulic pump 40 and thereby project the boom 33 upwardly and forwardly until the blade 34 at the upper end of the boom pushes against and bites into the tree 78, as shown in Figure 1, with sufficient force to prevent the tree, during the sawing operation, from leaning toward the apparatus and closing up the saw cut 133 from closing and wedging the saw 79 therein. Usually this pressure of the boom on the tree is sufficient to cause the saw cut to open so that the upper side of the saw cut diverges from the lower side thereof, as shown in Figure 1.

The bumper roller 77 and the boom blade 34 having been engaged with the tree 78, the driver of the apparatus, still seated in the seat 57, pushes the saw-feed control rod 123 forwardly, whereby the valve 122 is opened to its first position and the hydraulic element 110, working through the lever 117, is caused to roll the saw carriage 84 forwardly until the saw 79 engages the tree 78 and feeds the saw forwardly at a predetermined rate as the saw cuts through the tree.

When the tree is cut through and falls in the direction determined by the pressure and direction of engagement of the boom 33, the saw feed control rod 123 is pulled rearwardly, thereby restoring the valve 122 to its neutral position and permitting the springs 118 and 119 to retract the lever 117 and hence the carriage 84 and the saw 79. The boom control rod 56 is then pushed rearwardly so as to move the pump valve 54 to a position in which the hydraulic cylinder 39 acts to withdraw the boom 33 downwardly and rearwardly to its starting point.

The saw drive control rod 104 is then drawn rearwardly so as to declutch the saw drive mechanism unit gear box 99 and thereby permit the saw 79 to slow down to a stop. The apparatus is then backed away from the stump of the felled tree and driven to another tree for a repetition of the cutting and felling operation described above.

After a number of trees have been felled and it is desired to cut the logs lying upon the ground 74 into sections, the set-screws 89, 89 on the saw carrier rod bearings 87 and 88 are loosened and the saw 79 turned from horizontal to vertical position by means of the hand lever 94, after which the set screws are retightened. The apparatus is then driven forwardly until the vertical edge of the saw is against the side or top of the log, whereupon the driver pushes the winch cable drum brake lever 130a forwardly so as to release the cable drum 62 and release the cable 63 to permit the grapple 57 to descend from the elevated position, such as shown in Figure 1, to the log grappling position shown in Figure 3. The winch clutch lever 68 is then moved to engaged position so that the cable drum 62 is operated to take up the slack in the cable 63 and elevate the grapple sufficiently to put an upward strain upon the log, which prevents the saw from binding in the log as a section of the log is being cut off. Further, the elevation of the log above the ground prevents the saw teeth from being damaged by contact with objects on the ground. When a section is thus cut off, the tongs or grapple 67 is lowered and then reengaged with the log at a predetermined distance from the last cut. The winch is then operated to tension the cable 63, so as to pull the log into lowest position under the saw without moving the apparatus, for the next cut. These operations are repeated upon the log which has been cut into the desired sections.

For loading felled logs or cut sections thereof on a pile or upon a truck, the tongs or grapple 67 is engaged with the log and the winch 61 then operated to raise the log to the desired height, whereupon the winch brake lever 130a is operated to lock the cable brake drum 62 and the apparatus is then driven to the place whereat the log is to be deposited. The brake lever is then operated to release the cable drum brake and permit the log to subside at the desired rate onto the pile, or car, or truck being loaded. More than one log at a time can be handled by using a sling (not shown) with the cable 63 along with or instead of the grapple 67.

What I claim is:

1. A logging machine comprising a track type tractor having an engine comprising, a front crankshaft take-off, a horizontal framework having a forward extension projecting from said tractor and a forward prolongation rigid with said forward extension, a saw mechanism mounted on the forepart of said framework, drive means operatively connecting said saw mechanism to said front crankshaft take-off, said saw mechanism comprising a saw carrier rod, a saw including a rotary saw shaft mounted on the forward end of said carrier rod, a carriage supporting said carrier rod, means mounting said carriage upon said forward extension for forward movement from a rearward starting position to feed the saw forwardly, drive mechanism on said carriage with which said drive means is operatively connected, an operating connection between said drive mechanism and said saw shaft, saw feeding means operatively connected to said carriage and to said front crankshaft take off whereby said carriage can be fed forwardly as said saw is driven, and tree trunk engaging guard means for said saw comprising a horizontally-disposed bumper carried by said prolongation transversely of said framework.

2. A logging machine comprising in combination a tractor vehicle having an engine having a rear power take-off and a front crankshaft take-off, saw mechanism mounted on the forepart of said tractor and operatively connected to said front crankshaft take-off, a forwardly extensible tree-engaging boom mounted on said tractor, and boom extending and retracting mechanism mounted on the rear part of said tractor and operatively connected to said rear power take-off, said saw mechanism comprising a carriage supported on said forepart of the tractor for forward feeding movement from a rearward starting position, and hydraulic feeding means for said carrier operatively connected to said front crankshaft take-off, said saw mechanism further comprising a circular saw, a saw carrier rod mounted on said carriage and carrying said saw at a forward part thereof, a prolongation of said forepart, said prolongation being offset with respect to the longitudinal medial line of said forepart, and a tree engaging bumper on said prolongation of said forepart of the tractor for engaging a tree toward which the machine is driven while the saw is retracted in the rearward starting position of said carriage and for engaging the tree while the saw is being fed forwardly while cutting the tree.

3. A logging machine comprising a tractor vehicle having an engine having a front crankshaft take-off, a saw mechanism mounted on the forepart of said tractor, means operatively connecting said saw mechanism with said crankshaft take-off, said operating means comprising saw driving means and saw feeding means, said saw mechanism comprising a carriage supported upon said forepart of the tractor for forward feeding movement from a rearward starting position, a saw carrying rod on said carriage and projecting forwardly therefrom, a circular saw carried on the forward end of said rod, a drive unit on said carriage operatively connected to said saw, a slidably extensible driving connection between said drive unit and said front crankshaft take-off affording continuous operation of said drive unit and said saw while said carriage is in any rearward or forward position, said saw feeding means comprising a horizontal hydraulic cylinder having a piston rod, a hydraulic pump feeding said cylinder and operatively connected to said front crankshaft take-off, valve means connected between said pump and said cylinder for producing forward projection of said piston rod while said valve means is open, a vertical lever pivoted at its upper end on said tractor and connected at its lower end to said carriage, a pin and slot connection between said piston rod and a point of said lever intermediate its ends whereby forward projection of said piston rod produces forward swinging of said lever and consequent forward feeding movement of said carriage and of the saw, and spring means for retracting said lever when said valve means is closed, whereby said saw and said carriage are retracted to said starting position.

EDDIE E. WHITE.

REFERENCES CITED

The following references are of record in the file of this patent:

UNITED STATES PATENTS

| Number | Name | Date |
| --- | --- | --- |
| 1,318,324 | Keon | Oct. 7, 1919 |
| 1,414,319 | Zaiauskis | Apr. 25, 1922 |
| 1,592,656 | Corona | July 13, 1926 |
| 1,602,357 | Georgelis | Oct. 5, 1926 |
| 1,707,518 | Garson | Apr. 2, 1929 |
| 2,330,996 | Rivers | Oct. 5, 1943 |
| 2,332,526 | Pehel | Oct. 26, 1943 |
| 2,341,035 | Grzelak | Feb. 8, 1944 |
| 2,354,625 | Van Sickle | July 25, 1944 |
| 2,365,408 | Hillyer | Dec. 19, 1944 |
| 2,411,623 | Jaques | Nov. 26, 1946 |
| 2,439,607 | Irwin | Apr. 13, 1948 |
| 2,461,589 | Crawford | Feb. 15, 1949 |
| 2,462,314 | Fuqua | Feb. 22, 1949 |
| 2,463,232 | Zimicki | Mar. 1, 1949 |